United States Patent [19]

Dorner et al.

[11] Patent Number: 5,586,685
[45] Date of Patent: Dec. 24, 1996

[54] APPARATUS FOR DISPENSING ARTICLES

[75] Inventors: Wolfgang C. Dorner; Michael A. Hosch, both of Oconomowoc; Darin L. Danelski, Dousman; David A. Remsing, Sussex, all of Wis.

[73] Assignee: Dorner Mfg. Corp., Hartland, Wis.

[21] Appl. No.: 313,016

[22] Filed: Sep. 27, 1994

[51] Int. Cl.⁶ ..................................................... B65H 1/00
[52] U.S. Cl. ........................................... 221/197; 221/285
[58] Field of Search .................................... 221/197, 282, 221/268, 270, 272, 232, 285, 287; 271/165, 145

[56] References Cited

U.S. PATENT DOCUMENTS

| | | | |
|---|---|---|---|
| 2,626,197 | 1/1953 | Kollock | 221/197 |
| 3,168,965 | 2/1965 | Rinn | 221/197 |
| 3,263,860 | 8/1966 | Haas | 221/285 |

Primary Examiner—Kenneth Noland
Attorney, Agent, or Firm—Sceales, Starke & Sawall Andrus

[57] ABSTRACT

An apparatus for dispensing articles from a stack onto a moving conveyor. The apparatus includes a supporting structure or frame that supports a stack of articles and the supporting structure is canted at an angle of about 15° to 25° from the vertical. The supporting structure is generally L-shaped in cross section, having a pair of walls located generally normal to each other, while the opposite sides of the supporting structure are open so that the articles can be loaded into the supporting structure through the open sides. The lowermost article in the stack is supported on an L-shaped base, so that only peripheral portions of adjacent side edges of the lowermost article are supported. A pusher plate is mounted for sliding movement relative to the supporting structure and acts to push the lowermost article from the stack and the dispensed article will then fall onto the moving conveyor below. A stripper is mounted to engage the second lowermost article in the stack to prevent that article from being displaced from the supporting structure as the lowermost article is pushed from the stack.

16 Claims, 2 Drawing Sheets

APPARATUS FOR DISPENSING ARTICLES

BACKGROUND OF THE INVENTION

In a sequential picking system, a number of different articles are separately stacked in dispensers mounted alongside a moving conveyor. Through operation of a computer program, articles are selectively dispensed from the dispensers onto the conveyor, and the articles are then conveyed to a location where they can be packaged for shipment to the customer.

As an example of a sequential picking system, video cassettes, each containing a different videotape, or small cardboard cartons containing pharmaceuticals or drug products, can be stacked in separate dispensers along the conveyor, and individually dispensed onto the conveyor to fill a purchase order.

In the past, dispensers as used in a sequential picking system have included an elongated vertical supporting structure, in which the articles are stacked. The conventional dispenser requires that the articles be top loaded into the dispenser and manual top loading is difficult and time consuming.

In a conventional dispenser, the lowermost article in the stack is normally supported throughout its surface area on a base or support, and a pusher acts to push the lowermost article across the base and onto the moving conveyor. The stroke of the pusher is determined by the size of the article, and in many cases the stroke may be several inches or more. Because of the long stroke, the delivery rate of the dispenser is relatively slow. A further problem arises in that pushing the article across the base may tend to wear off printing or other finish that is applied to the surface of the article.

As the entire accumulated weight of the stack is on the lowermost article in the stack, there is considerable frictional resistance to the displacement of the lowermost article by the pusher, with the result that the other articles in the stack will tend to move with the lowermost article. Thus, it is necessary to incorporate a stripper, which will prevent the second lowermost article, as well as all articles above the second lowermost article, from being displaced as the lowermost article is moved by the pusher.

SUMMARY OF THE INVENTION

The invention is directed to an improved apparatus for dispensing stacked articles onto a moving conveyor, and has particular application for use in a sequential picking system, in which a series of dispensers are located along the length of a conveyor.

In accordance with the invention, the dispensing apparatus includes a supporting structure or frame, which supports the stack of articles, and the frame is tilted or canted at an angle of about 15° to 25°, and preferably about 20°, to the vertical.

The supporting structure is generally L-shaped in transverse cross-section, and includes a pair of supporting walls, which are located generally normal to each other. The opposite sides of the supporting structure are open, so that the articles can be side loaded into the supporting structure.

The lowermost article in the stack is supported on an L-shaped base, so that only the peripheral portions of two adjacent side edges of the lowermost article are supported. The lowermost article is adapted to be pushed from the stack by a pusher plate, which is operated by a fluid cylinder that extends at an acute angle to the side of the conveyor. Through operation of the cylinder, the pusher will engage the lowermost article and push the article from the base, where it will fall onto the moving conveyor.

A stripper is mounted on the supporting structure in position to engage the second lowermost article in the stack, and prevent that article from being displaced as the pusher moves the lowermost article onto the conveyor.

As the supporting structure which supports the stack is tilted, there is less accumulated weight of the articles on the lowermost article. Thus, the frictional resistance to displacement of the lowermost article is decreased, with the result that the size of the drive unit can be reduced. As a further benefit, there is less potential damage to printing or other surface finish on the articles as it is pushed from the stack.

Because of the tilt of the supporting structure, the stack is supported by only two adjacent walls, and thus the articles can be manually stacked in the supporting structure by side loading as opposed to top loading.

The lowermost article in the stack is not supported throughout its entire surface area on the base, but instead only portions of two adjacent side edges are supported on the base. With this construction, the lowermost article can be moved from the base with a short stroke of the pusher which greatly increases the rate of delivery of the dispenser, as compared with prior art dispensers.

As the fluid cylinders, which operate the pusher plates, are not located between dispensers, but instead extend laterally from the conveyor, the dispensers can be located in close proximity to each other along the length of the conveyor.

The invention also incorporates a dampening mechanism with the power operated fluid cylinder, which substantially dampens the noise generated by the cylinder. As a great number of dispensers may be located along the length of the conveyor, dampening of the cylinder noise is an important benefit of the invention.

Other objects and advantages will appear during the course of the following description.

DESCRIPTION OF THE DRAWINGS

The drawings illustrate the best mode presently contemplated of carrying out the invention.

In the drawings:

FIG. 3 is a section taken along line 3—3 of FIG. 2;

FIG. 4 is a section taken along line 4—4 of FIG. 3; and

DESCRIPTION OF THE ILLUSTRATED EMBODIMENT

Figure 1:
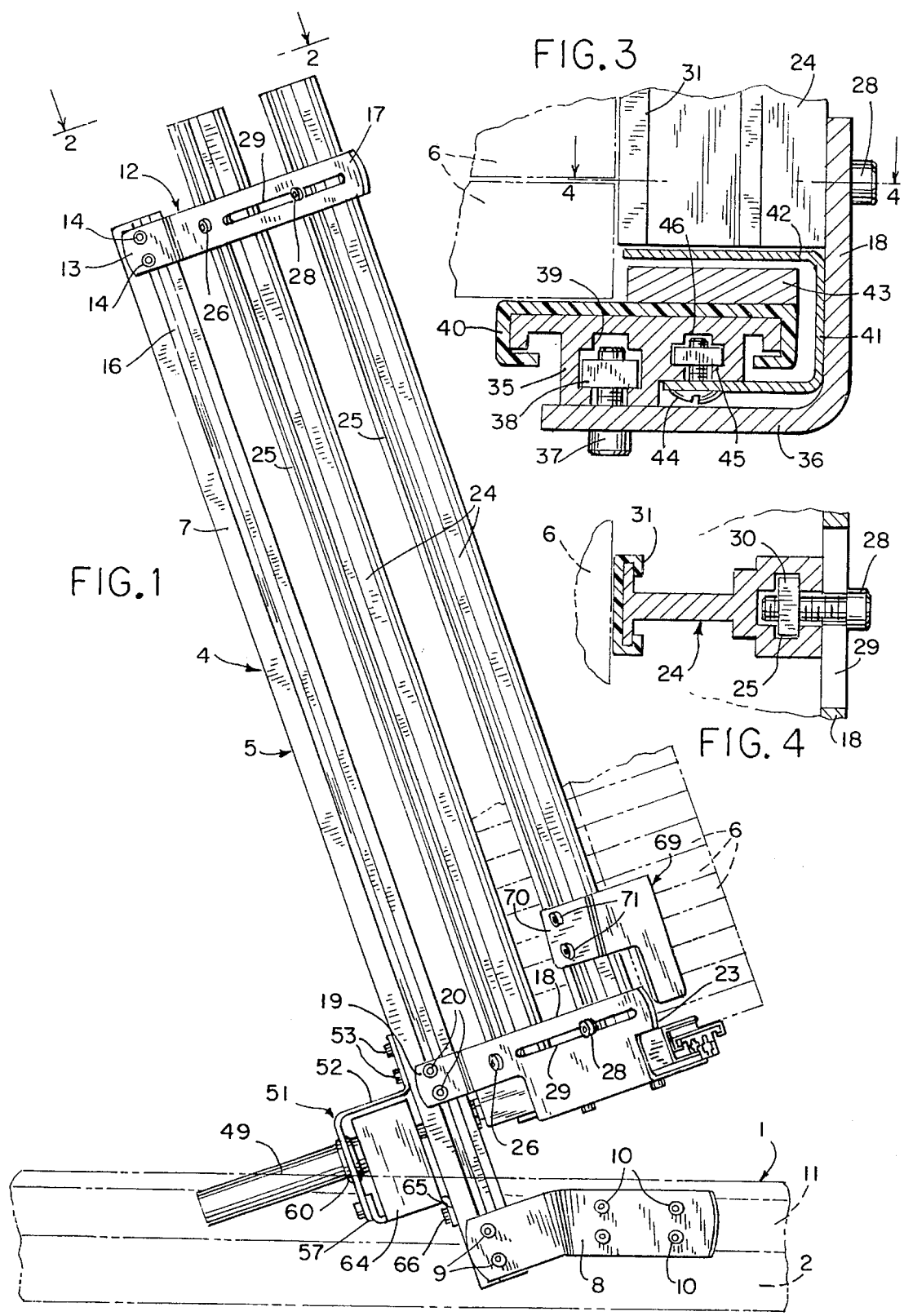
FIG. 1 is a side-elevation of a dispensing unit of the invention as associated with a conveyor.
Figure 2:
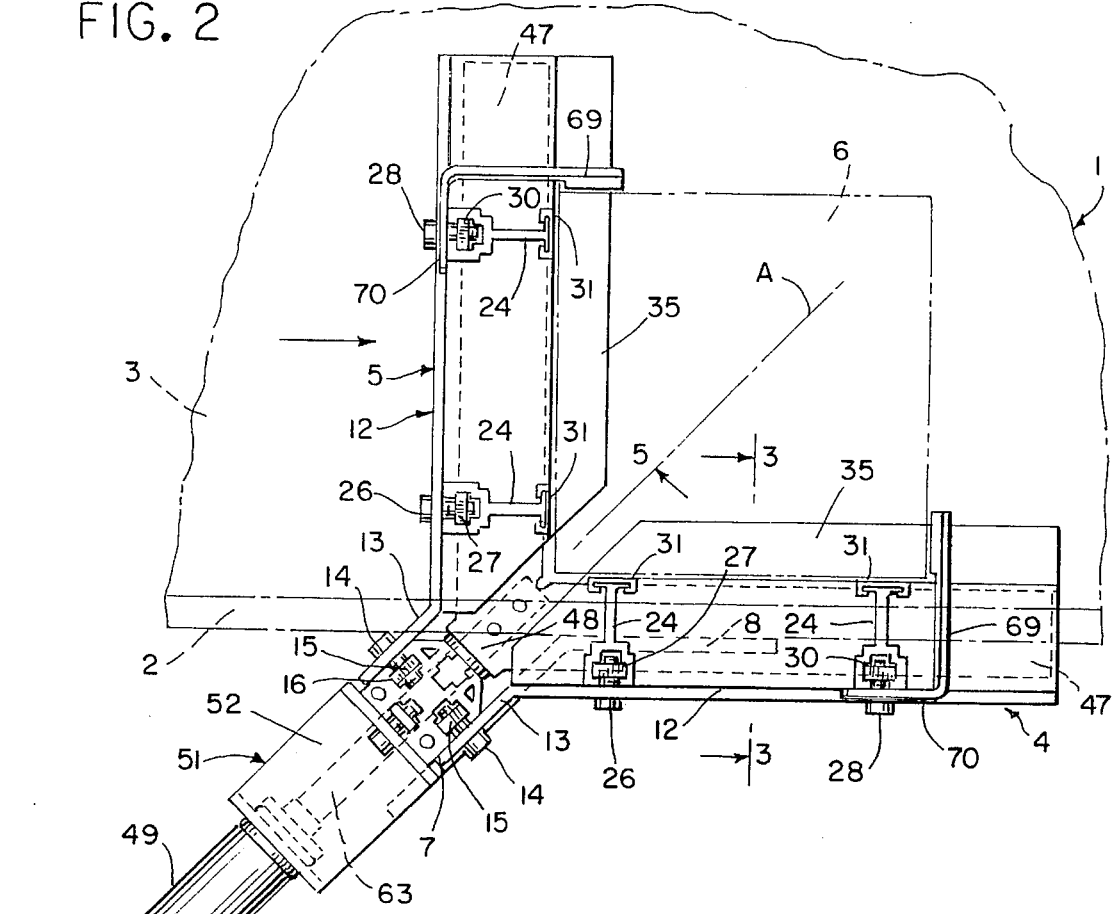
FIG. 2 is a section taken along line 2—2 of FIG. 1.

FIGS. 1 and 2 illustrate a dispenser for dispensing articles onto a moving conveyor 1, and has particular use in a sequential picking system. Conveyor 1 can be a conventional type such as that shown in U.S. Pat. No. 5,174,435, and includes a pair of side rails 2 and an endless conveyor belt 3 is mounted for movement relative to the side rails.

In operation, a series of dispensers 4 may be mounted along the length of conveyor 1, with each dispenser containing a stack of articles to be dispensed onto the moving conveyor in accordance with a computerized program. The articles may take the form of small rectilinear articles such as video cassettes, small cardboard cartons and the like. In practice, the articles of each stack are of the same type, and are different from articles in stacks contained in adjacent dispensers. Through a computerized system, one or more articles can be dispensed from each dispenser 4 onto conveyor 1, to fill a purchase order and the articles are then conveyed to a location where they can be packaged for shipment.

Each dispenser 4 includes an elongated frame or supporting structure 5 that supports a stack of articles 6 in superimposed relation. The supporting structure consists of a column 7, preferably formed of an aluminum extrusion, and the lower end of the column is connected to one of the side rails 2 through a bracket 8. Screws 9 connect one end of the bracket to the lower end of column 7 while a second group of screws or bolts 10 connect the opposite end of brackets to a slide (not shown), which is movable within a T-shaped slot 11 formed in the side rail. The connection of the bracket 8 to the side rail 2 can be similar to that described in U.S. Pat. No. 5,174,435.

As best shown in FIG. 1, column 7 is tilted or canted outwardly from the side rail 2 at an angle of about 15° to 25° with respect to the vertical, and preferably about 20°.

A pair of upper brackets 12 are adjustably connected to the upper end of column 7. Each bracket 12 includes an inner leg 13 and bolts 14 extend through holes in leg 13 and are engaged with nuts 15, which are slidable within a T-shaped slot 16 formed in column 7.

Each bracket 12 also includes an outer leg 17, which is located at an angle to the corresponding leg 13, and the legs 17 of the two brackets 12 are positioned at 90° to each other, as shown in FIG. 2, with one of the legs 17 extending transversely across the conveyor belt 3 and the other leg 17 disposed parallel to side rail 2.

A pair of second lower brackets 18 are mounted on the lower end of column 7 beneath brackets 12, and have basically the same configuration as brackets 12 and are connected to the column 7 in the same manner as previously described. Each lower bracket 18 includes a leg 19 that is connected to column 7 through bolts 20. Bolts 20 extends through openings in leg 19 and are threaded with nuts (not shown) that are mounted for sliding movement in T-slot 16, in column 7. Each bracket 18 also includes an outer leg 23, and the legs 23 of the two brackets 18 are located generally normal to each other, with the leg 23 of one of the brackets 18 extending transversely across the conveyor 1, while the leg 23 of the other bracket 18 is disposed parallel to side rail 2.

Vertical supports strips 24 are connected to legs 17 of upper brackets 12 and to legs 23 of lower brackets 18. As best seen in FIG. 3, each support strip 24 is preferably an aluminum extrusion and is formed with longitudinal T-shaped slot 25. Bolts 26 extend through holes in legs 17 and 23 and are threaded in nuts 27 that are slidable in T-slots 25 of the inner support strips 24, while bolts 28 extend through elongated slots 29 in legs 17 and 23 and are engaged with nuts 30 that are slidable in T-slots 25 of the outer support strips 24. The elongated slots 29 enable the outer support strips 24 to be moved toward and away from the inner strips 24 to thereby accommodate articles 6 of different sizes.

A plastic cover 31 is snap-fitted over the inner end of each support strip 24, and extends the full height of the strip. The stack of articles 6 rests against the covers 31, and the plastic covers reduce the frictional resistance of the articles as they move downwardly within the dispenser.

As best seen in FIG. 2, a pair of support strips 24 define a first supporting wall and a second pair of support strips 24 define a second wall which serve to support a stack of articles 6. Articles 6 are preferably rectilinear, and have opposed flat faces. As the dispenser, including column 7 and supports strips 24, is tilted along the plane A, as shown in FIG. 2, a portion of the weight of the articles 6 in the stack is carried by the support strips 24, which reduces the accumulated weight on the lowermost article in the stack. Due to the tilting, two sides of the dispenser are open, so that the articles can be loaded manually into the dispenser from the side, as opposed to conventional units which require top loading.

The lowermost article 6 in the stack is supported on a generally L-shaped base composed of a pair of base members 35, which are located generally normal to each other. As shown in FIG. 3, each base member 35 is connected to the lower inwardly extending flange 36 on the respective lower brackets 18. To provide the connection, bolts 37 extend through holes in the flanges 36 and are engaged with nuts 38, which are mounted in T-shaped slots 39 formed in the lower surface of the base member. A plastic protective cover 40 is mounted on the upper surface of each base member 35. Cover 40 is formed of a material having a low coefficient of sliding friction and is assembled with the base member 35 by sliding the cover longitudinally onto the base member.

As best seen in FIG. 3, a generally U-shaped protector 41 is connected to each base member 35, and the upper leg or flange 42 of the protector 41 is spaced above the cover 40 to provide a space for a pusher 43. As shown in FIG. 3, the lower leg of protector 41 is connected to the base member 35 by screw 44, which extends through an opening in the lower leg of the protector, and is engaged with the nut 45 slidably mounted within T-shaped slot 46 in base member 35.

Pusher 43 is mounted to slide across the upper surface of base members 35 and push the lowermost article 6 from the stack of articles. As best shown in FIG. 2, pusher 43 includes a pair of legs 47, which are located at 90° with respect to each other, and are adapted to engage two adjacent sides of the lowermost article 6. Legs 47 are joined at a junction 48, which extends at an angle of about 45° to the side rail 2 of conveyor 1.

Pusher 43 is moved in a reciprocating stroke of movement by a fluid cylinder unit that projects outwardly at an angle of about 45° with respect to the side rail 2. The fluid cylinder unit includes a cylinder 49, which is connected to the lower end of column 7 through a bracket 51. The upper leg 52 of bracket 51 is connected to column 7 by a pair of bolts 53, which are engaged with nuts 54 that are slidable within a T-shaped slot 56 formed in column 7.

Bracket 51 is also provided with a second leg 57 that is parallel to leg 52, and a nose mount 58 that is threaded on the end of cylinder 49 extends through an opening in leg 57. Nose mount 58 includes a radially extending flange 59 and the leg 57 is positioned between the end of the cylinder and the flange 59 as shown in FIG. 5.

O-rings 60 and 61 are mounted around the nose mount 58 and O-ring 60 is located between the end of cylinder 49 and leg 57, while O-ring 61 is located between leg 57 and flange 59 on the nose mount. As the cylinder 49 is cantilevered from the column 7, the O-rings 60 and 61 provide a self-aligning fit, and further serve a noise dampening function.

A piston rod 62 projects outwardly of cylinder 49, and the piston rod is threadedly connected to one end of a guide rod 63. Guide rod 63 is located within the side flanges of a bracket 64. As shown in FIG. 1, the lower flange 65 of the bracket is connected to column 7 by a bolt 66, which is engaged with a nut, not shown, that is mounted to slide within slot 56 of the column.

Figure 5:
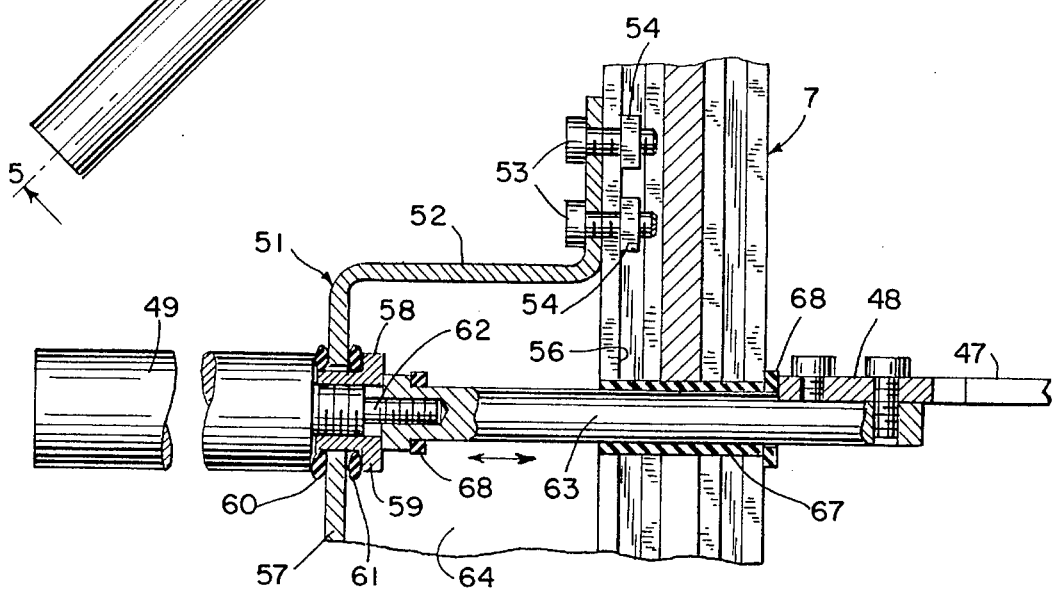
FIG. 5 is a section taken along line 5—5 of FIG. 2.

Guide rod 63 is mounted for sliding movement within a bushing 67 that is mounted within an opening in column 7 as best shown in FIG. 5. The outer end of rod 63 is connected to the junction 48 of pusher 43. With this construction, outward movement of the piston rod will move the pusher 43 outwardly to thereby push the lowermost article 6 from the base members 35. As only two side edge portions of the article is supported on the base members 35, the lowermost article will be displaced from the base members by a relatively short stroke of movement of the pusher 43, which in practice, is about one half inch. The movement of the article as it is being displaced from the stack is at an angle of about 45° with respect to the direction of movement of conveyor belt 3, which is shown by the arrow in FIG. 2. Thus, the orientation of the article will not be changed as it is engaged with the moving conveyor.

To further dampen the noise generated by the fluid cylinder unit, a pair of urethane washers 68 are mounted on guide rod 63 on either side of column 7. The washers will engage the column at the ends of the stroke of the cylinder to cushion the action and reduce the operating noise of the cylinder 49.

A pair of strippers 69 are mounted on the supporting structure 5 of the dispenser and are positioned to engage the second lowermost article in the stack to prevent that article from being dislodged from the stack during the movement of pusher 43. Each stripper 69 includes an upper flange 70, which is located generally normal to the stripper, and the flange 70 is connected to the outer support 24 by bolts 71. Bolts 71 extends through holes in flange 70 and are engaged with nuts (not shown), mounted within the T-slots 25 of the support strip 24. This connection permits the strippers 69 to be adjusted vertically in accordance with the height of the individual articles 6 in the stack.

The tilted configuration of the supporting structure or frame 5 of the dispenser reduces the accumulated weight of the articles on the lowermost article in the stack, thus enabling the lowermost article to be more readily pushed from the stack without damage to printing or other surface finishing.

The tilted configuration also permits the articles to be side loaded into the dispenser, thus greatly facilitating the manual loading of the articles as compared to a top loading device.

As only narrow portions of adjacent side edges of the lowermost article in the stack are supported on the base members 35, the lowermost article can be pushed from the base with a relatively short stroke of movement. This not only reduces the size of the fluid cylinder unit, but also increases the delivery rate of the dispenser.

Various modes of carrying out the invention are contemplated as being within the scope of the following claims, particularly pointing out and distinctly claiming the subject matter which is regarded as the invention.

I claim:

1. An apparatus for dispensing articles onto a conveyor, comprising a conveyor having a pair of generally parallel side rails and a conveyor member mounted for travel between said side rails, an elongated supporting structure for supporting a stack of vertically stacked articles, said supporting structure disposed at a level above the conveyor member and having a longitudinal axis disposed at an acute angle to the vertical, said supporting structure including a base to support a lowermost article of said stack, said base including a pair of intersecting side edges disposed at an acute angle to each and facing the longitudinal axis of said supporting structure, said base disposed to support a peripheral portion of said lowermost article with said lowermost article projecting from said side edges in a direction toward said axis, pusher means including a pusher mounted for sliding movement on said base and disposed to engage the lowermost article and push said lowermost article from the stack and deposit said article on the conveyor member, and stripper means mounted on the supporting structure and disposed to be engaged by a second lowermost article in the stack to prevent movement of said second lowermost article from the stack as the lowermost article is pushed from the stack.

2. The apparatus of claim 1, wherein said article is rectilinear in shape and includes a pair of first parallel sides and a pair of second parallel sides, one of said first sides and one of said second sides of the lowermost article being supported on said base.

3. The apparatus of claim 2, wherein said pusher is generally L-shaped and includes a pair of arms connected at a junction, one arm disposed to engage said first side of the lowermost article, and the other arm disposed to engage said second side of the lowermost article.

4. The apparatus of claim 1, wherein said supporting structure comprises a column and a pair of walls that extend outwardly from the column at an angle of about 90° with respect to each other.

5. The apparatus of claim 3, wherein said pusher means includes a fluid cylinder unit operably connected to said pusher.

6. The apparatus of claim 5, wherein said fluid cylinder unit comprises a cylinder connected to the supporting structure, and a piston rod slidable relative to the cylinder and connected to said pusher.

7. The apparatus of claim 6, wherein the axis of the cylinder is located at an angle of about 45° with respect to a side rail of the conveyor.

8. The apparatus of claim 7, wherein the axis of the cylinder bisects the angle between the arms of the pusher.

9. In combination, a conveyor including a conveyor frame and a conveyor member mounted for travel on the frame in a given direction, a dispenser disposed above the conveyor member for individually dispensing articles onto the conveyor member, said dispenser including an elongated supporting structure for supporting a stack of superimposed articles, said supporting structure having a longitudinal axis disposed at an acute angle with respect to the vertical, said supporting structure including a generally L-shaped base to support a lowermost article in the stack, said L-shaped base having a pair of legs disposed at an angle to each other, a peripheral portion of the lowermost article being supported on said legs, pusher means including a pusher mounted for sliding movement relative to the base and disposed to engage the lowermost article and push the lowermost article from the stack and deposit said article on the conveyor member, and stripper means mounted on the supporting structure and disposed to be engaged by a second lowermost article in the stack to prevent movement of the second lowermost article from the stack as the lowermost article is pushed from the stack.

10. A combination of claim 9, wherein one leg of said base is disposed parallel to a side edge of the conveyor, and the other leg of the base is disposed generally normal to said side edge of the conveyor.

11. The combination of claim 10, wherein said pusher means includes a fluid cylinder unit composed of a cylinder member and a piston member, one of said members being connected to the supporting structure and the other of said members being connected to said pusher.

12. The combination of claims 9, wherein said pusher means includes a fluid cylinder unit operably connected to said pusher, said fluid cylinder unit having a longitudinal axis disposed at an angle of about 45° with respect to a side edge of the conveyor member.

13. The combination of claim 9, wherein said supporting structure is generally L-shaped in cross-section and includes a first wall and a second wall connected to the first wall at a junction, the sides of said supporting structure opposite said first and second walls being open.

14. The combination of claim 9, wherein said longitudinal axis lies in a vertical plane that extends at an angle of about 45° with respect to a side edge of the conveyor member, said longitudinal axis being tilted outwardly from said side edge at an angle of 15°–25° with respect to the vertical.

15. In combination, a conveyor including a pair of parallel side rails and an endless belt mounted for movement on said side rails in a direction of travel, a dispenser disposed above the conveyor for individually dispensing articles onto the conveyor, each article being generally rectilinear in shape and including a pair of parallel first side edges and a pair of parallel second side edges, each article also having opposed flat faces, said dispenser including a dispensing frame disposed to support a stack of said articles, said dispenser frame having a longitudinal axis disposed at an acute angle to the vertical, said dispenser frame including a generally L-shaped base to support a lowermost article in the stack, said L-shaped base including a pair of legs disposed generally normal to each other, a first side edge portion of the lowermost article being supported on one of said legs and an adjacent second side edge portion of the lowermost article being supported on the other of said legs, pusher means including a pusher plate mounted for sliding movement relative to the base and disposed to engage the lowermost article in the stack and push said lowermost article from the stack and deposit the article on the conveyor, said pusher means also including a fluid cylinder operably connected to the pusher plate, said fluid cylinder projecting outwardly of a side rail of the conveyor and having a longitudinal axis disposed at an acute angle with respect to said side rail.

16. An apparatus for dispensing articles, comprising an elongated supporting structure for supporting a stack of superimposed articles, said supporting structure being generally L-shaped in cross section and including a first wall and a second wall connected to the first wall at a junction, the sides of said supporting structure opposite said first and second walls being open, said first wall being disposed at an angle of about 90° with respect to said second wall, each of said walls being disposed in a non-vertical plane, a supporting base secured to a lower edge portion of each of said walls to support a lowermost article in the stack, said bases being constructed and arranged to support only a first portion of the periphery of said lowermost article with a second portion of said periphery being unsupported, and a pusher member disposed above the base and disposed to slide relative to the base to push the lowermost article from the stack.

\* \* \* \* \*